United States Patent [19]

Napadow

[11] Patent Number: 4,469,595
[45] Date of Patent: Sep. 4, 1984

[54] FILTER ASSEMBLY FOR A SPRAY BOOTH

[75] Inventor: Stanley C. Napadow, Elgin, Ill.

[73] Assignee: Protectaire Systems Company, Elgin, Ill.

[21] Appl. No.: 431,156

[22] Filed: Sep. 30, 1982

[51] Int. Cl.³ .................................................. B01D 35/08
[52] U.S. Cl. ............................ 210/111; 55/DIG. 46; 55/288; 98/115 SB; 118/326; 210/167
[58] Field of Search ............... 210/167, 111, 119, 128; 55/288, 242, DIG. 46; 118/326; 98/115 SB

[56] References Cited

U.S. PATENT DOCUMENTS

| | | | |
|---|---|---|---|
| 2,788,954 | 4/1957 | Paasche | 210/167 |
| 2,981,525 | 4/1961 | Umbricht | 210/167 |
| 3,289,839 | 12/1966 | Muller | 210/111 |
| 3,341,016 | 9/1967 | Paasche | 210/167 |
| 3,424,129 | 1/1969 | Peeps et al. | 118/326 |

*Primary Examiner*—Peter A. Hruskoci
*Assistant Examiner*—Sharon T. Cohen
*Attorney, Agent, or Firm*—Fitch, Even, Tabin & Flannery

[57] ABSTRACT

A paint spray booth including water wash means for removing airborn paint particles from air flowing through the booth. A holding tank at the bottom of the booth collects the water from the water wash means and a pump recirculates the water from the holding tank to the water wash means near the top of the booth. A filtering tank is connected to the holding tank and is located outside the booth. A pair of filters are disposed in series in the filtering tank and filter the water as it passes from the holding tank to the pump. The filters are individually removable from the filter tank for cleaning and/or replacement so that when one filter becomes clogged, it can be removed and cleaned while the other filter continues the filtering process so that there is no interruption in use of the spray booth.

9 Claims, 5 Drawing Figures

FILTER ASSEMBLY FOR A SPRAY BOOTH

BACKGROUND OF THE INVENTION

The present invention relates to filters, and more particularly to a filter assembly for use in filtering recirculating water in a spray booth.

Spray booths are used for a variety of purposes, for example, for spray painting articles. One of the problems encountered in spray booths is that of prevently escape of errant airborne particles. In paint spray booths, a solid sheet or curtain of water or a water spray intersects the path of air flowing through the booth and washes the particles out of the air. A holding tank is provided at the bottom of the booth to collect the wash water and a pump recirculates the water from the tank to the top of the booth.

It will be appreciated that the wash water used in these booths quickly becomes contaminated with the paint particles and it is necessary to continuously filter the water before redelivery by the pump to the top of the booth. Standard filtering assemblies include a screen over an intake pipe forming part of a conduit which connects the tank to the pump. The intake pipe is located near the bottom of the tank and because huge amounts of water are recirculated in this environment, the screen quickly becomes clogged. To clean the screen, it is necessary to shut down the booth and empty the water in the tank. This is very expensive not only because of lost time in operation of the spray booth but also because the water has chemicals added to it to prevent growth of algae and to consolidate the paint particles. Water containing these chemicals cannot be dumped into a sewer but must be sent off to an expensive disposal system.

The booth cannot be operated with a clogged filter or screen because the flow of water is reduced thereby reducing the effectiveness of the water wash system. Furthermore, should the filter or screen be completely clogged, the pump can overload and overheat. Therefore, it is desirable to provide a filter assembly for water wash spray booths which functions to satisfactorily filter the water and which allows for easy cleaning without requiring interruption of use of the spray booth and without requiring frequent disposal of the water.

SUMMARY OF THE INVENTION

The present invention overcomes the problems and disadvantages of the prior art by providing a filter assembly in a water wash spray booth which includes a pair of filters arranged in series and positioned in a filter tank outside the spray booth. The filter tank is connected to the recirculating pump and receives water from the holding tank so that the filters remove paint particles from the water before delivery to the pump. The filter tank is open at the top and the filters are easily removable so that one of them can be removed and cleaned while the other continues to filter the water. Thus, the filter assembly of this invention is operable to filter the circulating water and is readily adapted to be cleaned when necessary without interruption of operation of the spray booth.

Furthermore, the filter tank can be constructed as an extension of the holding tank and provides that a substantial amount of sludge can accumulate at the bottom of the holding tank before requiring that the water be dumped. In addition, the filter assembly of the present invention is adapted to be used in connection with an audio or visual indicator which will alert appropriate personnel when the filter system needs to be cleaned. In this manner, efficient operation of the spray booth is maintained and damage to the water pump is avoided.

Additional objects and advantages of the invention will be set forth in part in the description which follows and in part will be obvious from the description, or may be learned by practice of the invention. The objects and advantages of the invention may be realized and attained by means of the instrumentalities and combinations particularly pointed out in the appended claims.

The accompanying drawings, which are incorporated in and constitute a part of this specification, illustrate embodiments of the invention and, together with the description, serve to explain the principles of the invention.

DESCRIPTION OF THE PREFERRED EMBODIMENT

Reference will be made in detail to the present preferred embodiment of the invention, an example of which is illustrated in the accompanying drawings.

Figure 1:
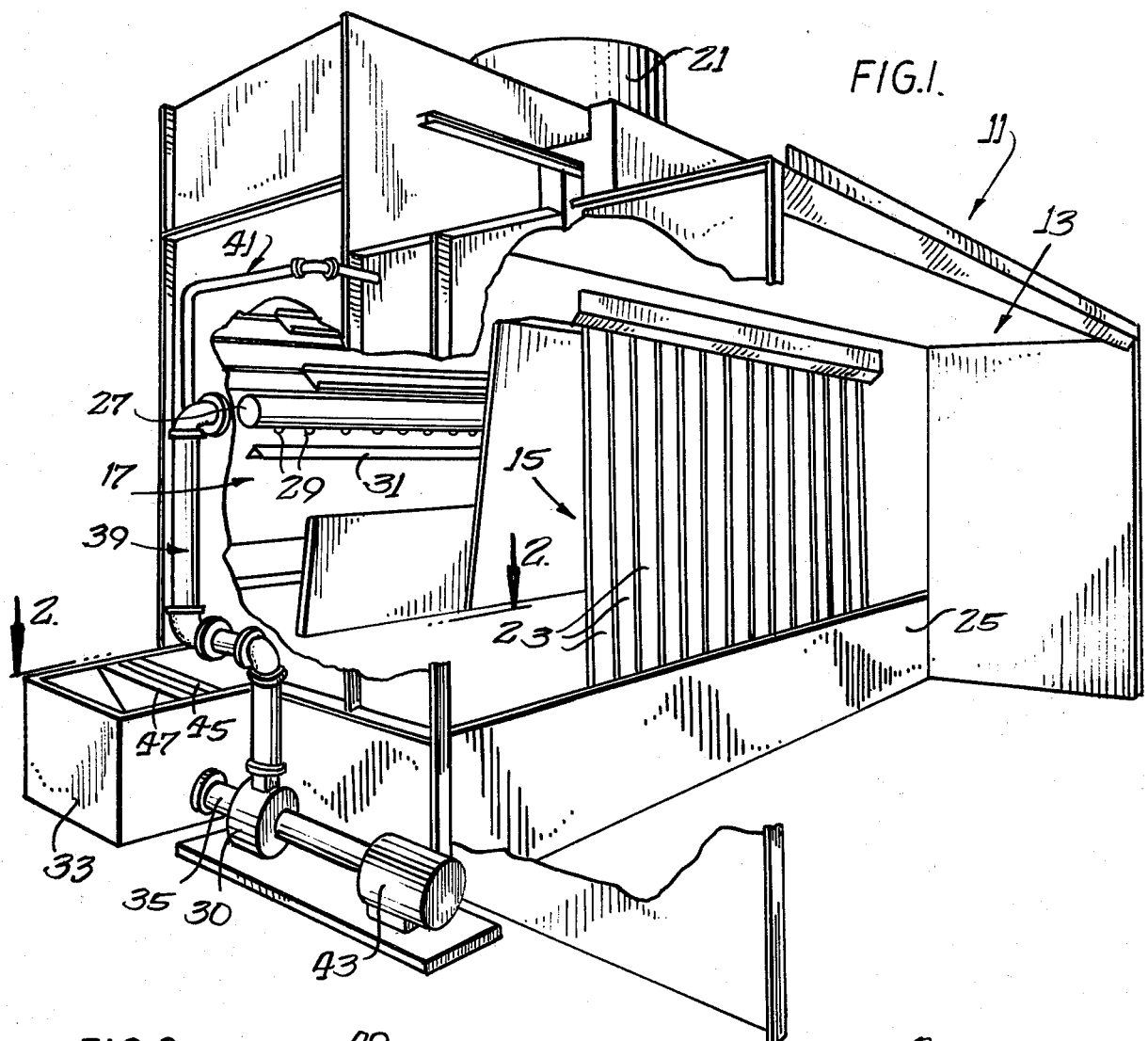
FIG. 1 is a perspective view partly broken away of a paint spray booth incorporating a water filter assembly according to the present invention.

A paint spray booth embodying the present invention is shown in FIG. 1 and is represented generally by the numeral 11. The booth includes a front section or work area 13 through which an article to be sprayed (not shown) is moved. A manually operated or automatic spray device (not shown) is used to apply paint to the article, the spray being either electrostatic or a pressurized airstream of paint particles as will be understood by those skilled in the art.

In paint spray booths, some of the solid airborne spray particles do not adhere to the article and it is necessary that these errant particles be removed from the air. In the spray booth 11, airborne spray particles which pass the work area 13 enter a first water wash means 15 and then a second water wash 17 at the rear of the booth 11. From there, the cleansed air is discharged out a chimney 21 which is connected to a blower or fan (not shown) which serves to pull the air through the booth.

The first water wash means 15 includes a plurality of spaced baffles 23 which are vertically mounted in the booth at the back of the work area 13. Water is caused to cascade downwardly along the baffles 23 and forms a sheet or curtain of water through which the airborne paint particles pass. The wash water then falls into a holding tank 25 at the bottom of the booth. The second water wash means 17 includes a manifold 27 provided with a plurality of downwardly facing nozzles 29.

Water is sprayed downwardly by the nozzles 29 and strikes a splash plate 31 and serves to wash paint particles from the air which escaped the first water wash means 15. Water from the nozzles 29 is also collected in the holding tank 25. Water in the tank 25 is recirculated to the first and second water wash means 15, 17 by a pump 30.

It will be appreciated that a large volume of water is required to effectively remove the airborne paint particles from the air passing through the booth. For example, effective performance of the first water wash means 15 requires at least thirty and as much as sixty gallons of water per linear foot flowing down the baffles 23. A booth having a baffle system ten feet wide requires a minimum of 300 gallons of water for the first water wash means alone.

It will also be appreciated that before the water is recirculated from the holding tank 25 to the pump and the water wash means, it is necessary that the water be filtered to remove the paint particles from it. The pump inlet is connected to the holding tank about two or three inches above the floor of the tank. A typical installation uses a screen covering the inlet inside the holding tank to filter the water before delivery to the pump. When the screen becomes clogged with paint particles, it is necessary to shut down the spray booth and then empty the water in the holding tank in order to clean the screen. This is a very expensive process, as described above, because of lost time in booth operation and because there are chemicals in the water which do not allow it to be dumped into the sewer.

In addition, the tank must be emptied when sludge accumulates at the level of the intake conduit, or approximately three inches from the floor of the tank. This also requires frequent interruption in spray booth use and the expensive disposal process discussed above.

In accordance with the invention, filter means is provided to filter the water in the holding tank 25 before delivery to the pump 30. This filter means includes two filters arranged in series and which are individually removable for cleaning and/or replacement upon becoming clogged. When one filter is removed, the other continues to filter the water so that there is no interruption in the operation of the spray booth.

As embodied herein, a filter tank 33 is provided outside the booth and is connected to the holding tank 25. As shown, the filter tank 33 can be an extension of the holding tank 25 and receives water from it. The filter tank 33 has an open top and is connected to the pump 30 by an inlet conduit 35. The pump outlet is connected by piping 39 to the second water wash means 17 and by piping 41 to the first water wash means 15. A motor 43 drives the pump 30 as will be understood by those skilled in the art.

As further embodied herein, a pair of filters 45,47 are positioned in series in the filter tank 33. The filter 45 is upstream of the filter 47 in the direction of flow of water to the conduit 35 and the pump 30. Both filters 45,47 have a screen mesh size which is capable of trapping substantially all of the paint particles in the wash water.

The filter tank 33 is has an open top and is provided with slide tracks 49,51 on opposite sides thereof, which slidably which receive filters 45,47 respectively. Preferrably, the tracks 49,51 are parallel and spaced as shown and are inclined in the direction of water flow. Although not critical, an angle of inclination of about 30 has been found to be desirable. A triangular shaped filler plate 52 covers the opening at the bottom of filter 45.

Figure 2:
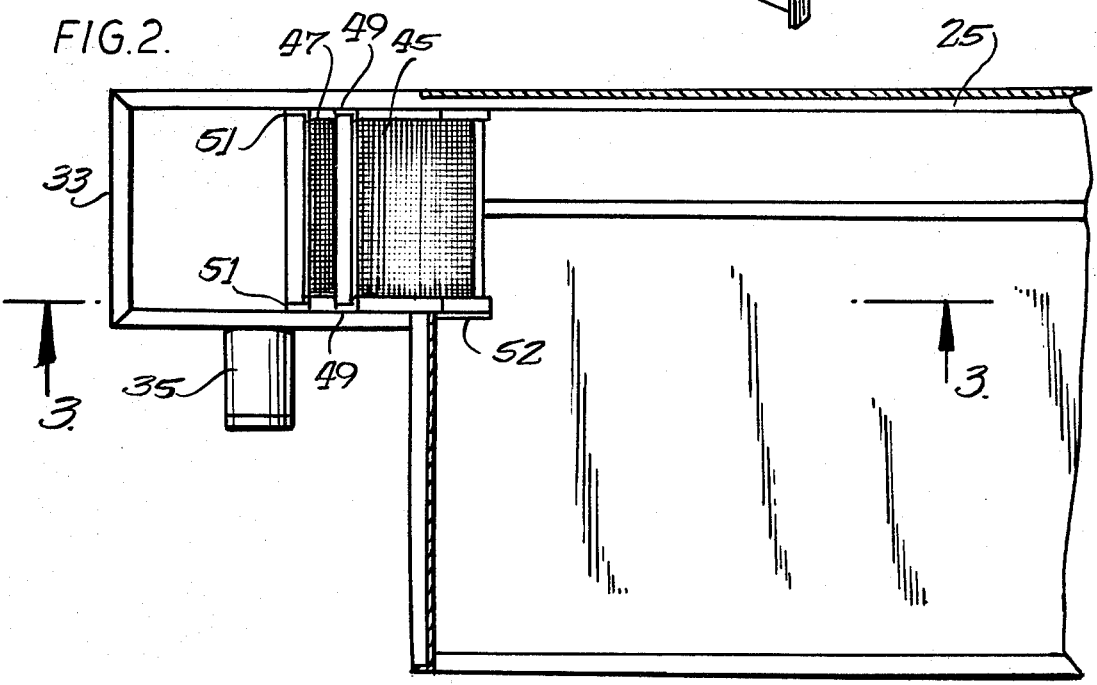
FIG. 2 is an enlarged sectional view of the structure of FIG. 1, taken along the line 2—2 thereof.

Thus, with the filters 45,47 in place as shown in FIG. 2, and by virtue of the fact that the filter tank 33 is outside the booth 11 and opened at its top, the upstream surfaces of the filters, particularly the upstream filter 45, is exposed to view as is the water level in the filter tank 33 both upstream and downstream of the filters. Visual observance will allow personnel to determine when sludge has built up on the filters, particularly upstream filter 45, to a point where it is clogged. When this occurs, the clogged filter is slid out of the filter tank, cleaned, and slid back in. While the clogged filter is being cleaned, the other filter remains in place and continues the filtering process. There is no interruption to use of the spray booth.

In addition, sufficient clogging of either or both filters 45,47 and continued operation of the pump 30 will cause the level of the water in the filter tank 33 downstream of the filters 45,47 to drop, again providing easy recognition of the clogged filter assembly.

Figure 3:
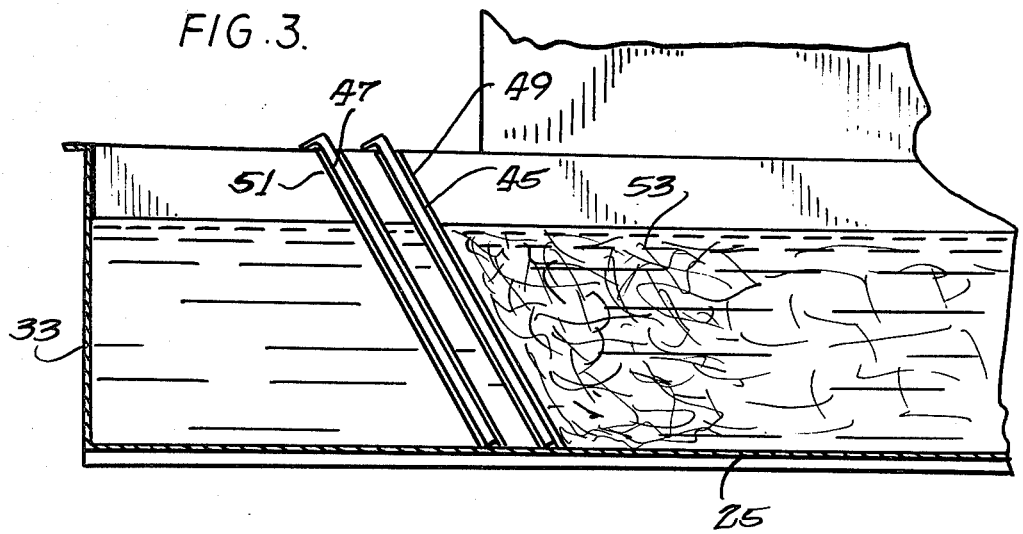
FIG. 3 is a sectional view of the structure of FIG. 2 taken along the line 3—3 thereof and showing the filter assembly unclogged.

Normal operation of the filter assembly when it is unclogged is shown in FIG. 3. The holding tank 25 has a normal level of water with an accumulation of sludge 53 therein. Water is filtered as it passes filters 45,47, with nearly all of it accumulating on the upstream side of the upstream filter 45. When sufficient sludge 53 has accumulated on the filter 45, it will be obvious to view and the filter 45 can be removed for cleaning as shown in FIG. 4.

Figure 4:
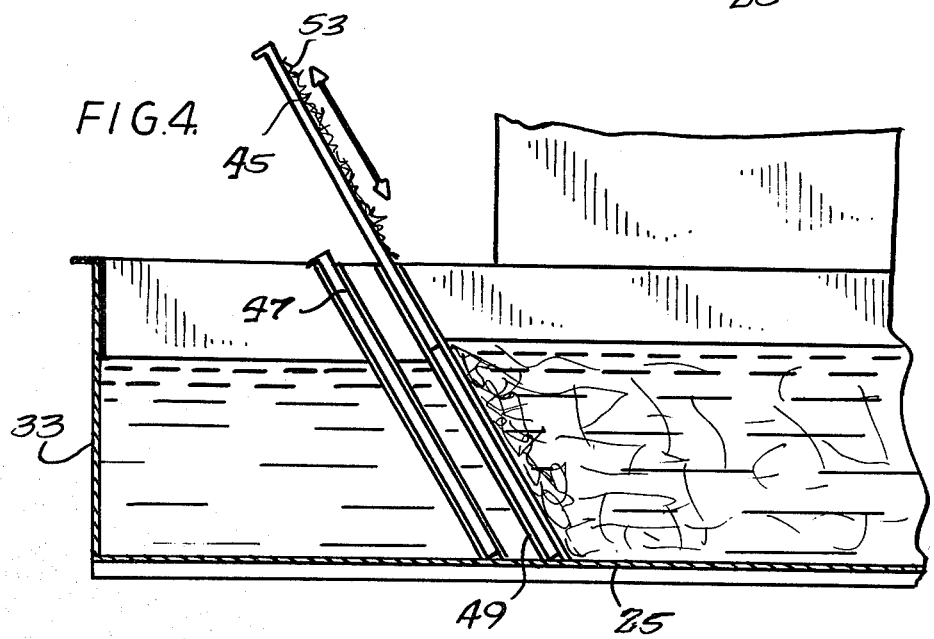
FIG. 4 is a view similar to FIG. 3 and showing one of the filters after becoming clogged and partially removed pursuant to cleaning.

In addition, when the filter 45 becomes clogged, the water level at the downstream side of it drops as shown in FIG. 4. Thus, one can observe both the accumulation of sludge 53 on the filter 45 and the drop in the water level at the downstream side of the filters and will become aware that one of the filters must be cleaned.

When one of the filters is removed by sliding it upwardly along its tracks as is shown in FIG. 4 for filter 45, the filtering system remains intact with the other filter 47 continuing to perform the filtering operation. There is no interruption to the filtering process and therefore no interruption to operation of the spray booth. Furthermore, there is no need to empty the holding tank 25 to carry out this process and no requirement for expensive disposal of the chemically treated water. When the filter 45 has been cleaned, it may be slipped back in place in the tracks 49. When a sufficient amount of sludge has built up on the filter 47, it too can be removed and cleaned in a similar fashion. Again, there is no interruption to the filtering process and no resulting interruption in the use of the spray booth.

It has been found that the filter system of the present invention allows a substantial build up of sludge in the holding tank 25 before the water therein must be dumped. For example, one installation utilizing this invention allows a build up of up to fourteen inches of sludge on the bottom of the tank 25, whereas in a similar booth utilizing a screened intake pipes at the holding tank allows only a three inch build up of sludge on the tank floor. This significantly reduces the cost of operating the spray booth.

Figure 5:
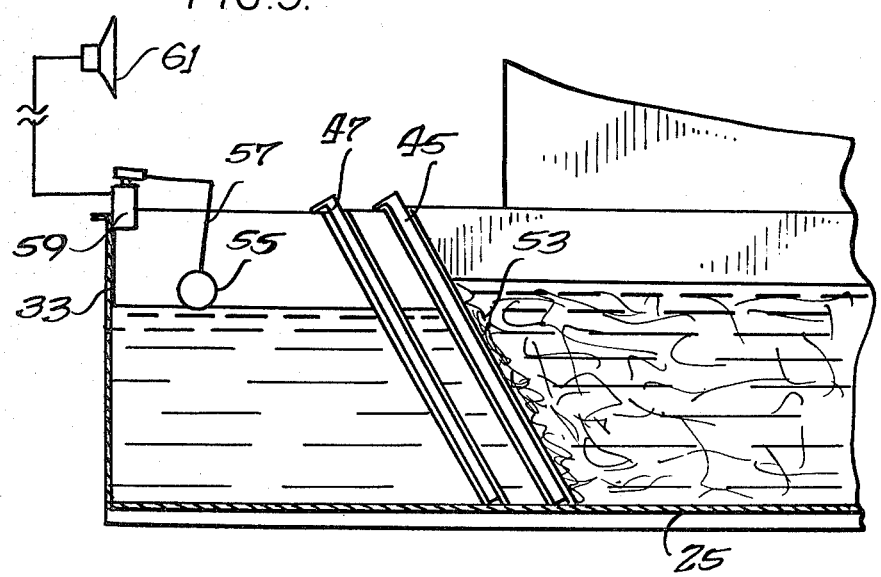
FIG. 5 is a view similar to FIG. 3 showing the filter assembly of the present invention used with an indicator and with the filter assembly clogged and requiring cleaning.

In the modified embodiment of FIG. 5, indicating means is employed in the filter tank downstream of the filters and is operable in response to the level of water in the filter tank downstream of the filter to indicate when the filter means is clogged. As embodied herein a float 55 is carried by an arm 57 pivoted to a housing 59 mounted on the filter tank 53. As the water level in the filter tank 33 downstream of the filters 45, 47 drops, the float 55 also drops causing the arm 57 to pivot in a clockwise direction as seen in FIG. 5. When the water level falls to a predetermined level an audible or visual indicator 61 is actuated advising the appropriate personnel that at least one of the filters is clogged and must be cleaned. In all other respects, the structure shown in FIG. 5 is substantially the same as that described above for FIGS. 1-4.

It will be apparent to those skilled in the art that various additions, substitutions, modifications and omissions can be made in the present invention without departing from the scope or spirit of the invention. Thus, it is intended that the present invention cover the additions, substitutions, modifications and omissions provided they come within the scope of the appended claims and their equivalents.

It will be appreciated that with the present invention, the water flow and volume of water flowing through the water washes may be kept more constant than in prior art booths having a filter in the booth at the pump. That is, in the conventional booth, the clogging of the filter reduces very substantially the volume of water being pumped to the water washes so that the efficiency of the scrubbing of particulates is reduced. The dropping of the water level in the filter tank provides a warning that was heretofore not available and therefore results in more timely and more frequent filter cleaning than with the conventional spray booths particularly because it is not necessary to stop operation of the booth to clean the clogging filter.

What is claimed is:

1. In a paint spray apparatus of the type including a booth, means including a pump for delivering water to an upper portion of said booth, means for causing said water to flow downwardly in said booth for washing paint particles from air flowing through said booth, the improvement comprising a holding tank at the bottom of said booth for collecting said water arranged to collect paint particles on the bottom of said holding tank to allow for a substantial build up of sludge in said holding tank, a filter tank outside said booth and between said holding tank and said pump, a water inlet between said tanks allowing water to flow from said holding tank into the filtering tank to be filtered, a filter assembly in said filtering tank including a pair of filters arranged in series and operable to filter said paint particles from the water flowing from said holding tank into said holding tank a water inlet to said pump in said filtering tank on the downstream side of said filters, said filters being individually removable from outside said filter tank.

2. The improvement of claim 1, said filters being parallel and spaced from one another.

3. The improvement of claim 2, said filters being inclined in the direction of flow of water to said pump.

4. The improvement of claim 3, the angle of inclination of said filters being about 30°.

5. The improvement of claim 1, said filters being slidably disposed in tracks formed in said intake filter tank.

6. The improvement of claim 1, said filter tank being formed as an extension of said holding tank.

7. The improvement of claim 1, said filter tank having an open top and said filters and the water level upstream and downstream of said filters is exposed to view whereby a drop in the water level downstream of said filters can be observed to indicate when at least one of said filters has become clogged.

8. The improvement of claim 1, including indicator means in said filter tank and responsive to the water level in said filter tank downstream of said filters to indicate when at least one of said filters has become clogged.

9. In a paint spray apparatus of the type including a booth, means including a pump for delivering water to an upper portion of said booth, means for causing said water to flow downwardly in said booth for washing paint particles from air flowing through said booth, a holding tank at the bottom of said booth for collecting said water arranged to collect paint particles on the bottom thereof and to allow for a substantial buildup of sludge in said holding tank holding tank adjacent the holding tank, one side of the filter tank being open to the holding tank, a water inlet between said tanks allowing water to flow from said holding tank into the filtering tank to be filtered a filter assembly for holding one or more filters in an located at said open side of said filter tank to filter the water flowing from said holding tank to said pump, paint particles accumulating on the holding side of the filters, one of said filters being individually removable for cleaning while another filter of the filter assembly is in position to continue the filtering operation while the one filter is being cleaned.

* * * * *

UNITED STATES PATENT AND TRADEMARK OFFICE
CERTIFICATE OF CORRECTION

PATENT NO. : 4,469,595

DATED : September 4, 1984

INVENTOR(S) : STANLEY C. NAPADOW

It is certified that error appears in the above-identified patent and that said Letters Patent is hereby corrected as shown below:

In the Abstract
Line 2, "airborn" should read --airborne--.
Line 7, "filtering" should read --filter--.
Line 9, "filtering" should read --filter--.

In the Specification
Column 3, line 62 after "33 delete "is".
Column 3, line 64 after "slidably" delete --which--.
Column 3, lines 64-65 "Preferrably" should read --Preferably--.

In the Claims
Column 5, line 48 "holding" should read --filtering-- 2nd occurrence.
Column 5, line 49 after "tank" insert a comma (,) 2nd occurrence.
Column 6, line 34 delete "holding tank" 2nd occurrence.
Column 6, line 40 "an" should read --and--.
Column 6, line 43 after "holding" insert --tank--.

Signed and Sealed this

Twenty-sixth Day of February 1985

[SEAL]

Attest:

DONALD J. QUIGG

Attesting Officer  Acting Commissioner of Patents and Trademarks